(12) United States Patent
Zhang et al.

(10) Patent No.: US 10,508,039 B2
(45) Date of Patent: Dec. 17, 2019

(54) PREPARATION METHOD OF SULFONATED TWO-DIMENSIONAL TITANIUM CARBIDE NANOSHEET

(71) Applicant: HOHAI UNIVERSITY, Nanjing, Jiangsu (CN)

(72) Inventors: Jianfeng Zhang, Jiangsu (CN); Hongbing Wang, Jiangsu (CN); Yuping Wu, Jiangsu (CN); Xin Zhang, Jiangsu (CN)

(73) Assignee: HOHAI UNIVERSITY, Nanjing, Jiangsu (CN)

( * ) Notice: Subject to any disclaimer, the term of this patent is extended or adjusted under 35 U.S.C. 154(b) by 161 days.

(21) Appl. No.: 15/735,238

(22) PCT Filed: May 6, 2016

(86) PCT No.: PCT/CN2016/081284
§ 371 (c)(1),
(2) Date: Dec. 11, 2017

(87) PCT Pub. No.: WO2017/005043
PCT Pub. Date: Jan. 12, 2017

(65) Prior Publication Data
US 2018/0179070 A1     Jun. 28, 2018

(30) Foreign Application Priority Data
Jul. 3, 2015 (CN) .......................... 2015 1 0389057

(51) Int. Cl.
*C01B 32/90* (2017.01)
*C01B 32/921* (2017.01)

(52) U.S. Cl.
CPC ............ *C01B 32/90* (2017.08); *C01B 32/921* (2017.08); *C01P 2002/82* (2013.01);
(Continued)

(58) Field of Classification Search
CPC ... C01B 32/90; C01B 32/921; C01P 2004/03; C01P 2004/04; C01P 2004/24; C01P 2002/82
See application file for complete search history.

(56) References Cited

FOREIGN PATENT DOCUMENTS

| CN | 103977835 | 8/2014 |
|---|---|---|
| CN | 104016345 | 9/2014 |

(Continued)

OTHER PUBLICATIONS

Nyberg, Harald, et al. "Tribochennical formation of sulphide tribofilnns from a Ti—C—S coating sliding against different counter surfaces." Tribology letters 56.3 (2014): 563-572.*

(Continued)

*Primary Examiner* — Richard M Rump
(74) *Attorney, Agent, or Firm* — Rankin, Hill & Clark LLP

(57) ABSTRACT

The present invention discloses a preparation method of a sulfonated two-dimensional titanium carbide nanosheet, which comprises the following steps of preparing two-dimensional titanium carbide by using aluminum atomic layers in hydrofluoric acid chemical stripping layer-shaped titanium aluminum carbide; preparing sulfanilic acid diazo-salt; conducting a sulfonation reaction between the two-dimensional titanium carbide and the sulfanilic acid diazo-salt to prepare the sulfonated two-dimensional titanium carbide nanosheet. The sulfonated two-dimensional titanium carbide nano material prepared through the present invention has good dispersity in water and common organic solvents, and a single-layer or few-layer sulfonated two-dimensional titanium carbide nanosheet with large size and high quality can be obtained after ultrasonic treatment is performed on a dispersion liquid. The preparation method has the characteristics of low production cost, easiness in (Continued)

obtaining raw materials, and simplicity and controllability during preparation.

8 Claims, 1 Drawing Sheet

(52) U.S. Cl.
CPC ...... *C01P 2004/03* (2013.01); *C01P 2004/04* (2013.01); *C01P 2004/24* (2013.01)

(56) References Cited

FOREIGN PATENT DOCUMENTS

| CN | 104528721 | 4/2015 |
|----|-----------|--------|
| CN | 104961131 | 10/2015 |

OTHER PUBLICATIONS

International Search Report filed in PCT/CN2016/081284 dated Aug. 15, 2016.

\* cited by examiner

PREPARATION METHOD OF SULFONATED TWO-DIMENSIONAL TITANIUM CARBIDE NANOSHEET

TECHNICAL FIELD

The present invention belongs to the field of nano material preparation technologies, and relates to a method of functional two-dimensional materials, and more particularly, to a preparation method of a sulfonated two-dimensional titanium carbide nanosheet.

BACKGROUND

Mxene is a novel two-dimensional transition metal carbide or carbonitride with a chemical formula of $M_{n+1}X_n$, wherein M refers to early stage transition metal, X refers to carbon or nitrogen, and n=1, 2 and 3. The two-dimensional material is obtained through tripping an A atomic layer from an MAX phase of a first-class ternary layered compound, and is named Mxene since it has a two-dimensional structure similar to graphene (Granphene). Since Barsoum and others from American Drexel University chemically tripped an Al atomic layer from a typical ternary layered compound $Ti_3AlC_2$ by utilizing hydrofluoric acid to obtain novel two-dimensional sheet-shaped titanium carbide (Michael Naguib et al., Two-dimensional nanocrystals produced by exfoliation of $Ti_3AlC_2$, *Advanced Materials*, 2011, 23(37): 4248-4253) for the first time in 2011, the Mxene material has been widely applied in many technical fields, such as catalysis, water treatment, energy storing device, supercapacitor, lithium ion battery, composite material, or the like etc. (S. Garaj, et al., Graphene as a subnanometre trans-electrode membrane, *Nature*, 2010, 467(7312): 190-192; Maria R. Lukatskaya et al., Cation intercalation and high volumetric capacitance of two-dimensional titanium carbide, *Science*, 2013, 341(6153): 1502-1505). After the two-dimensional Mxene is compounded by a chemical method, since the surface energy of a nano particle is relatively high, the two-dimensional Mxene tends to focusing in the aspect of thermodynamics, and is easy to agglomerate and subside in a solution, which greatly affect to give full play to the excellent performances of the novel two-dimensional material. Conducting functionalization on the surface of the Mxene nanosheet may improve the dispersity and the solubleness of the material, but will not affect the two-dimensional nature of the Mxene nanosheet. Due to the high hydrophilia of sulfonic acid groups, a sulfonation treatment to Mxene may not only increase the dispersity of Mxene but also keep the unique nature of Mxene. Meanwhile, since a VDW binding force between two-dimensional Mxene layers is relatively large, it is difficult to obtain a single-layer or few-layer two-dimensional nanosheet even if a high strength ultrasonic treatment is performed for a long time. After a high-reactivity active molecule containing sulfonic acid functional groups is connected with the surface of the two-dimensional nanosheet or is inserted between the layers of the two-dimensional nanosheet, the single-layer or few-layer two-dimensional Mxene nanosheet may be obtained through weak ultrasounds. At present, the preparation of the sulfonated two-dimensional titanium carbide nanosheet has not been reported.

SUMMARY

Object of the invention: regarding the technical defects that two-dimensional Mxene is easy to agglomerate and subside and is difficult to obtain a single-layer or few-layer nanosheet, the present invention provides a preparation method of a sulfonated two-dimensional titanium carbide nanosheet with high dispersity, large size and high quality.

Technical solution: in order to achieve the technical object above, the present invention provides a preparation method of a sulfonated two-dimensional titanium carbide nanosheet, which comprises the following steps of:

(1) preparing two-dimensional titanium carbide sediment by using aluminum atomic layers in hydrofluoric acid chemical stripping layer-shaped titanium aluminum carbide;

(2) redispersing the two-dimensional titanium carbide sediment obtained in step (1) into water to obtain a two-dimensional titanium carbide suspension;

(3) dissolving sulfanilic acid and sodium nitrite in a hydrochloric acid solution to react under an ice-bath condition to obtain sulfanilic acid diazosalt solution;

(4) adding the sulfanilic acid diazosalt solution obtained in step (3) into the two-dimensional titanium carbide suspension liquid obtained in step (2), reacting for a certain time by magnetic stirring under the ice-bath condition to make the two-dimensional titanium carbide have a sulfonation reaction with the sulfanilic acid diazosalt, so as to obtain a sulfonated two-dimensional titanium carbide solution; and (5) centrifugalizing and precipitating the sulfonated two-dimensional titanium carbide solution obtained in step (4), then washing the solution by deionized water till the pH is 5 to 6, then filtering the solution by a millipore filter and redispersing the solution into water to obtain a sulfonated two-dimensional titanium carbide dispersion liquid, then conducting ultrasonic treatment on the dispersion liquid to obtain a single-layer or few-layer sulfonated two-dimensional titanium carbide dispersion liquid, and then freezing and drying the dispersion liquid to obtain sulfonated two-dimensional titanium carbide powder.

Preferably, in step (1), the reaction condition of the titanium aluminum carbide and the hydrofluoric acid is that: the concentration of the hydrofluoric acid is 10 to 50 wt %, a stirring reaction is conducted for 2 to 8 h at a stirring speed of 1500 to 2000 rpm under 25 to 60□, and then the reaction solution is filtered and repeatedly washed till the pH is neutral, and then centrifuged to obtain the two-dimensional titanium carbide sediment.

In step (2), the concentration of the two-dimensional titanium carbide sediment after being redispersed into the water is 0.01 to 0.05 g/ml.

Preferably, in step (3), the mass ratio of the sulfanilic acid to the sodium nitrite and the hydrochloric acid solution is 40 to 50:8 to 12:10 to 15, wherein the hydrochloric acid solution is preferably 37 wt % concentrated hydrochloric acid.

In step (4), the volume ratio of the two-dimensional titanium carbide suspension liquid to the sulfanilic acid diazosalt solution is 1:1 to 5.

In step (4), the time of the sulfonation reaction between the two-dimensional titanium carbide and the sulfanilic acid diazosalt is 2 to 6 h.

In step (5), the ultrasonic treatment time of the sulfonated two-dimensional titanium carbide dispersion liquid is 1 to 4 h.

The sulfonated two-dimensional titanium carbide nanosheet obtained by the preparation method above is also in the protection scope of the present invention.

Beneficial effects: regarding the technical defects that the two-dimensional Mxene is easy to agglomerate and subside and it is difficult to obtain a single-layer or few-layer nanosheet, the present invention provides a preparation method of a sulfonated two-dimensional titanium carbide nanosheet, which uses a typical ternary layered transition metal carbide or carbonitride $Ti_3AlC_2$ as the raw material, and uses hydrofluoric acid to chemically trip an Al atomic layer in $Ti_3AlC_2$ to obtain a two-dimensional $Ti_3C_2$ nanosheet, and conducts a sulfonation reaction between the sulfanilic acid diazosalt solution and the $Ti_3C_2$ nanosheet to prepare the single-layer or few-layer sulfonated two-dimensional titanium carbide nanosheet with high dispersity, large size and high quality. The preparation method has the characteristics of low production cost, easiness in obtaining raw materials, and simplicity and controllability during preparation.

DETAILED DESCRIPTIONS

In order to better understand the invention, the content of the invention is further described with reference to the embodiments hereinafter, but the content of the invention is not limited to the following embodiments. In each of the following embodiments, a conventional method is used to prepare a sulfanilic acid diazosalt solution, i.e., sulfanilic acid and sodium nitrite are dissolved in a hydrochloric acid solution to react under an ice-bath condition to obtain the sulfanilic acid diazosalt solution, wherein the mass ratio of the sulfanilic acid to the sodium nitrite and the hydrochloric acid solution (37 wt % concentrated hydrochloric acid) is 40 to 50:8 to 12:10 to 15.

Figure 1:
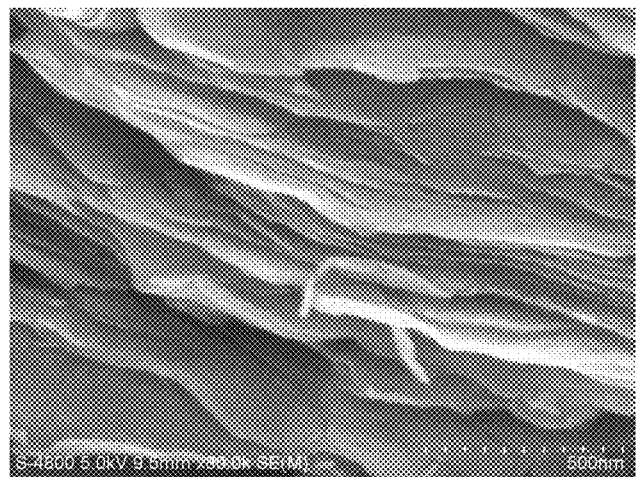
FIG. 1 is a scanning electron microscope of sulfonated two-dimensional titanium carbide obtained in embodiment 1 of the present invention.
Figure 2:
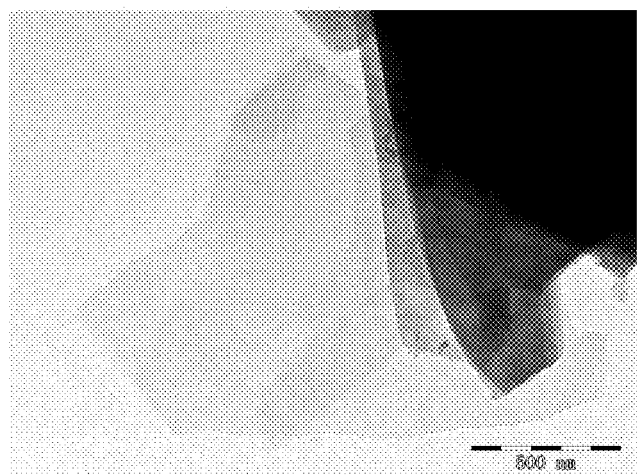
FIG. 2 is a transmission electron microscope of the sulfonated two-dimensional titanium carbide obtained in embodiment 1 of the present invention.
Figure 3:
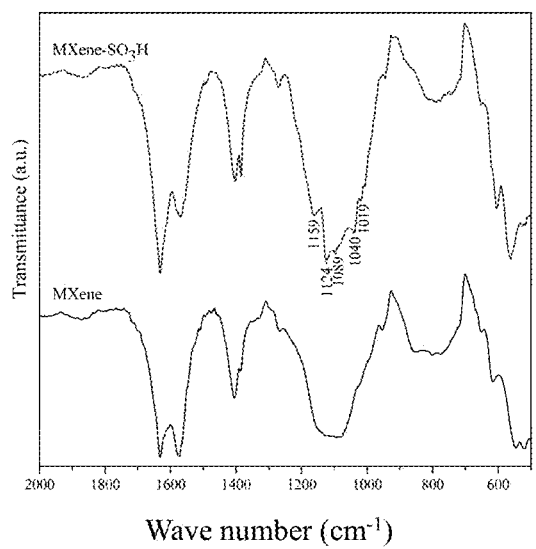
FIG. 3 is an infrared spectrogram of the sulfonated two-dimensional titanium carbide obtained in embodiment 1 of the present invention before and after sulfonation.

Embodiment 1 Preparation of Sulfonated Two-Dimensional Titanium Carbide Nanosheet (1) 0.1 g $Ti_3AlC_2$ powder was dipped into 20 mL 50 wt % HF water solution under 25☐, reacted for 8 h under magnetic stirring by a rotating speed of 1500 r/min to obtain a suspension; the obtained suspension was filtered and repeatedly washed by water till the pH was neutral, and then centrifuged for 10 min by a rotating speed of 6000 r/min to obtain two-dimensional titanium carbide sediment;
(2) the sediment above was redispersed into 10 ml water for ultrasonic treatment for 30 min, 10 ml sulfanilic acid diazosalt solution was dropwise-added under the ice-bath condition, reacted for 2 h under magnetic stirring, which was a sulfonation procedure, so as to obtain a sulfonated two-dimensional titanium carbide solution;
(3) the sulfonated two-dimensional titanium carbide solution above was centrifuged for 10 min by a rotating speed of 4000 r/min for separation and precipitation, and then repeatedly washed by water till the pH was 5 to 6, the solution was filtered by a millipore filter with a bore diameter of 0.22 micron, and redispersed into water for ultrasonic treatment for 2 h to obtain a single-layer or few-layer sulfonated two-dimensional titanium carbide dispersion liquid; upon observation, the dispersion liquid had no sediment after standing, which proved that the dispersion liquid had good dispersity. The obtained product was freeze-dried for 24 h to obtain single-layer or few-layer sulfonated two-dimensional titanium carbide nanosheet powder. FIG. 1 is a scanning electron microscope of the sulfonated two-dimensional titanium carbide obtained in embodiment 1, and it can be seen from the figure that the sulfonated product still maintains the sheet-shaped feature thereof. FIG. 2 is a transmission electron microscope of the sulfonated two-dimensional titanium carbide obtained, and it can be seen from the figure that the sulfonated product is a single-layer or few-layer nanosheet after ultrasonic treatment. FIG. 3 is an infrared spectrogram of the obtained sulfonated two-dimensional titanium carbide before and after sulfonation, and the characteristic peaks marked by numbers in the figure showed that the surface of the two-dimensional titanium carbide was successively grafted with the sulfonic acid groups.

Embodiment 2 Preparation of Sulfonated Two-Dimensional Titanium Carbide Nanosheet (1) 0.3 g $Ti_3AlC_2$ powder was dipped into 40 mL 40 wt % HF water solution under 40☐, reacted for 4 h under magnetic stirring by a rotating speed of 1500 r/min to obtain suspension; the obtained suspension liquid was filtered and repeatedly washed by water till the pH was neutral, and then centrifuging by 6000 r/min for 10 min to obtain two-dimensional titanium carbide sediment;
(2) the sediment above was redispersed into 30 ml water for ultrasonic treatment for 30 min, 20 ml sulfanilic acid diazosalt solution was dropwise-added under the ice-bath condition, reacted for 6 h under magnetic stirring, which was a sulfonation procedure, so as to obtain a sulfonated two-dimensional titanium carbide solution;
(3) the sulfonated two-dimensional titanium carbide solution above was centrifuged for 10 min by a rotating speed of by 4000 r/min for separation and precipitation, and then repeatedly washed by water till the pH was 5 to 6, the solution was filtered by a millipore filter with a bore diameter of 0.22 micron, and redispersed into water for ultrasonic treatment for 4 h to obtain a single-layer or few-layer sulfonated two-dimensional titanium carbide dispersion liquid; or freeze-dried for 24 h to obtain single-layer or few-layer sulfonated two-dimensional titanium carbide nanosheet powder.

Embodiment 3 Preparation of Sulfonated Two-Dimensional Titanium Carbide Nanosheet (1) 0.2 g $Ti_3AlC_2$ powder was dipped into 30 mL 40 wt % HF water solution under 50☐, reacted for 2 h under magnetic stirring by a rotating speed of 1500 r/min to obtain suspension; the obtained suspension liquid was filtered and repeatedly washed by water till the pH was neutral, and then centrifuging by 6000 r/min for 10 min to obtain two-dimensional titanium carbide sediment;
(2) the sediment above was redispersed into 20 ml water for ultrasonic treatment for 30 min, 30 ml sulfanilic acid diazosalt solution was dropwise-added under the ice-bath condition, reacted for 3 h under magnetic stirring, which was a sulfonation procedure, so as to obtain a sulfonated two-dimensional titanium carbide solution;
(3) the sulfonated two-dimensional titanium carbide solution above was centrifuged for 10 min by a rotating speed of by 4000 r/min for separation and precipitation, and then repeatedly washed by water till the pH was 5 to 6, the solution was filtered by a millipore filter with a bore diameter of 0.22 micron, and redispersed into water for ultrasonic treatment for 1 h to obtain a single-layer or few-layer sulfonated two-dimensional titanium carbide dispersion liquid; or freeze-dried for 24 h to obtain single-layer or few-layer sulfonated two-dimensional titanium carbide nanosheet powder Embodiment 4 Preparation of Sulfonated Two-Dimensional Titanium Carbide Nanosheet (1) 0.1 g $Ti_3AlC_2$ powder was dipped into 20 mL 10 wt % HF water solution under 60☐, reacted for 2 h under magnetic stirring and under 40☐ by a rotating speed of 1500 r/min to obtain suspension; the obtained suspension liquid was filtered and repeatedly washed by water till the pH was neutral, and then centrifuging by 6000 r/min for 10 min to obtain two-dimensional titanium carbide sediment;

(2) the sediment above was redispersed into 10 ml water for ultrasonic treatment for 30 min, 20 ml sulfanilic acid diazosalt solution was dropwise-added under the ice-bath condition, reacted for 4 h under magnetic stirring, which was a sulfonation procedure, so as to obtain a sulfonated two-dimensional titanium carbide solution;

(3) the sulfonated two-dimensional titanium carbide solution above was centrifuged for 10 min by a rotating speed of by 4000 r/min for separation and precipitation, and then repeatedly washed by water till the pH was 5 to 6, the solution was filtered by a millipore filter with a bore diameter of 0.22 micron, and redispersed into water for ultrasonic treatment for 2 h to obtain a single-layer or few-layer sulfonated two-dimensional titanium carbide dispersion liquid; or freeze-dried for 24 h to obtain single-layer or few-layer sulfonated two-dimensional titanium carbide nanosheet powder.

Embodiment 5 Preparation of Sulfonated Two-Dimensional Titanium Carbide Nanosheet (1) 0.1 g $Ti_3AlC_2$ powder was dipped into 40 mL 20 wt % HF water solution under 25☐, reacted for 8 h under magnetic stirring by a rotating speed of 1500 r/min to obtain suspension; the obtained suspension liquid was filtered and repeatedly washed by water till the pH was neutral, and then centrifuging by 6000 r/min for 10 min to obtain two-dimensional titanium carbide sediment (2) the sediment above was redispersed into 10 ml water for ultrasonic treatment for 30 min, 20 ml sulfanilic acid diazosalt solution was dropwise-added under the ice-bath condition, reacted for 4 h under magnetic stirring, which was a sulfonation procedure, so as to obtain a sulfonated two-dimensional titanium carbide solution;

(3) the sulfonated two-dimensional titanium carbide solution above was centrifuged for 10 min by a rotating speed of by 4000 r/min for separation and precipitation, and then repeatedly washed by water till the pH was 5 to 6, the solution was filtered by a millipore filter with a bore diameter of 0.22 micron, and redispersed into water for ultrasonic treatment for 3 h to obtain a single-layer or few-layer sulfonated two-dimensional titanium carbide dispersion liquid; or freeze-dried for 24 h to obtain single-layer or few-layer sulfonated two-dimensional titanium carbide nanosheet powder.

The invention claimed is:

1. A preparation method of a sulfonated two-dimensional titanium carbide nanosheet, comprising:

(1) preparing two-dimensional titanium carbide sediment by using aluminum atomic layers in hydrofluoric acid chemical stripping layer-shaped titanium aluminum carbide;

(2) redispersing the two-dimensional titanium carbide sediment obtained in step (1) into water to obtain a two-dimensional titanium carbide suspension;

(3) dissolving sulfanilic acid and sodium nitrite in a hydrochloric acid solution to react under an ice-bath condition to obtain sulfanilic acid diazosalt solution;

(4) adding the sulfanilic acid diazosalt solution obtained in step (3) into the two-dimensional titanium carbide suspension liquid obtained in step (2), reacting for a certain time by magnetic stirring under the ice-bath condition to make the two-dimensional titanium carbide have a sulfonation reaction with the sulfanilic acid diazosalt, so as to obtain a sulfonated two-dimensional titanium carbide solution; and (5) centrifugalizing and precipitating the sulfonated two-dimensional titanium carbide solution obtained in step (4), then washing the solution by deionized water until the pH is 5 to 6, then filtering the solution by a millipore filter and redispersing the solution into water to obtain a sulfonated two-dimensional titanium carbide dispersion liquid, then conducting ultrasonic treatment on the dispersion liquid to obtain a single-layer or few-layer sulfonated two-dimensional titanium carbide dispersion liquid, and then freezing and drying the dispersion liquid to obtain sulfonated two-dimensional titanium carbide powder.

2. The preparation method of a sulfonated two-dimensional titanium carbide nanosheet according to claim 1, wherein, in step (1), the reaction condition of the titanium aluminum carbide and the hydrofluoric acid is that: the concentration of the hydrofluoric acid is 10 to 50 wt %, a stirring reaction is conducted for 2 to 8 h at a stirring speed of 1500 to 2000 rpm under 25 to 60° C., and then the reaction solution is filtered and repeatedly washed till the pH is neutral, and then centrifuged to obtain the two-dimensional titanium carbide sediment.

3. The preparation method of a sulfonated two-dimensional titanium carbide nanosheet according to claim 1, wherein, in step (2), the concentration of the two-dimensional titanium carbide sediment after being redispersed into the water is 0.01 to 0.05 g/ml.

4. The preparation method of a sulfonated two-dimensional titanium carbide nanosheet according to claim 1, wherein, in step (3), the mass ratio of the sulfanilic acid to the sodium nitrite and the hydrochloric acid solution is 40 to 50:8 to 12:10 to 15.

5. The preparation method of a sulfonated two-dimensional titanium carbide nanosheet according to claim 1, wherein, in step (4), the volume ratio of the two-dimensional titanium carbide suspension liquid to the sulfanilic acid diazosalt solution is 1:1 to 5.

6. The preparation method of a sulfonated two-dimensional titanium carbide nanosheet according to claim 1, wherein, in step (4), the time of the sulfonation reaction between the two-dimensional titanium carbide and the sulfanilic acid diazosalt is 2 to 6 h.

7. The preparation method of a sulfonated two-dimensional titanium carbide nanosheet according to claim 1, wherein, in step (5), the centrifugal condition of the sulfonated two-dimensional titanium carbide nanosheet is 4000 to 6000 rpm and centrifugation for 5 to 8 min.

8. The preparation method of a sulfonated two-dimensional titanium carbide nanosheet according to claim 1, wherein, in step (5), the ultrasonic treatment time of the sulfonated two-dimensional titanium carbide dispersion liquid is 1 to 4 h.

\* \* \* \* \*